(12) United States Patent
Kim et al.

(10) Patent No.: US 7,681,595 B2
(45) Date of Patent: Mar. 23, 2010

(54) MICROFLUIDIC DEVICE CAPABLE OF EQUALIZING FLOW OF MULTIPLE MICROFLUIDS IN CHAMBER, AND MICROFLUIDIC NETWORK EMPLOYING THE SAME

(75) Inventors: Sung-Jin Kim, Daejon (KR); Kwang-Hyo Chung, Daejon (KR); Hyeon-Bong Pyo, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 605 days.

(21) Appl. No.: 11/675,146

(22) Filed: Feb. 15, 2007

(65) Prior Publication Data
US 2008/0072964 A1 Mar. 27, 2008

(30) Foreign Application Priority Data
Sep. 27, 2006 (KR) ...................... 10-2006-0094384

(51) Int. Cl.
*F15C 1/06* (2006.01)
(52) U.S. Cl. ...................... 137/825; 137/806; 137/613; 137/602
(58) Field of Classification Search .................. 137/806, 137/825, 833, 602, 613
See application file for complete search history.

(56) References Cited

U.S. PATENT DOCUMENTS

| | | | |
|---|---|---|---|
| 6,150,119 A | 11/2000 | Kopf-Sill et al. | |
| 6,766,817 B2 | 7/2004 | da Silva | |
| 6,901,963 B2 * | 6/2005 | Kim et al. | 137/833 |
| 6,918,404 B2 | 7/2005 | da Silva | |
| 7,066,586 B2 | 6/2006 | da Silva | |
| 7,156,117 B2 * | 1/2007 | Bohm | 137/14 |
| 7,285,255 B2 | 10/2007 | Kadlec et al. | |
| 2005/0045238 A1 * | 3/2005 | Yang et al. | 137/833 |

FOREIGN PATENT DOCUMENTS

| JP | 2000-153142 | 6/2000 |
|---|---|---|
| KR | 1020040013731 | 2/2004 |

OTHER PUBLICATIONS

Zhao, Bin, et al., "Surface-Directed Liquid Flow Inside Microchannels", Feb. 9, 2001, *Science*, vol. 291.

* cited by examiner

*Primary Examiner*—John Rivell
*Assistant Examiner*—Craig M Schneider
(74) *Attorney, Agent, or Firm*—Ladas & Parry LLP (57) ABSTRACT

Provided are a microfluidic device and a microfluidic network formed by connecting such microfluidic devices. The microfluidic device can equalize the flow of multiple microfluids in a chamber in parallel to thereby have an equal flow rate when the microfluids transferred through different flow channels join in the chamber having a changing cross-sectional area. The microfluidic device includes: multiple flow channels formed between an upper substrate and a lower substrate to transfer the microfluids and including inlets for injecting the microfluids in one side and fluid stopping surfaces for stopping the flow of the microfluids in the other side; a pressure controlling flow channel for removing a pressure difference between the microfluids; a fluid converging part for converging the microfluids; and a chamber composed of hydrophilic surfaces and hydrophobic surfaces disposed alternately in a flow direction so that the microfluids join and flow in parallel and equal.

12 Claims, 9 Drawing Sheets

MICROFLUIDIC DEVICE CAPABLE OF EQUALIZING FLOW OF MULTIPLE MICROFLUIDS IN CHAMBER, AND MICROFLUIDIC NETWORK EMPLOYING THE SAME

FIELD OF THE INVENTION

The present invention relates to a microfluidic device capable of equalizing flow of multiple microfluids in a chamber and a microfluidic network employing the same; and, more particularly, to a microfluidic device that can make a plurality of microfluids flow into a chamber in parallel with a uniform meniscus to thereby have an equal flow rate when the microfluids transferred through different flow channels join in the chamber having a changing cross-sectional area, and a microfluidic network formed by connecting such microfluidic devices.

DESCRIPTION OF RELATED ART

A microfluidic device may be applied to automatic micro analysis system such as biosensors, bio chips, high throughput screening (HTS) systems, combinatory chemistry systems and the like. The above systems include a complicated microfluidic network where a plurality of flow channels simultaneously converge and diverge. Each fluid control unit requires valves for stoppage and pumps for transfer, and diverse phenomena occur in the parts where the flow channels converge or diverge.

Generally, when two different kinds of microfluids having different contact angles and surface tensions flow through different flow channels and join in a chamber having a changing cross-sectional area, a microfluid having a lower contact angle and a lower surface tension flows faster than the other microfluid. Although the two microfluids have similar properties, expansion in the cross-sectional area of the chamber makes the line end shape, i.e., meniscus, of the fluids convex. The flow mobility of the fluids becomes even more unequal, if the hydrophilic property of the surface of the chamber is a little different.

When the two microfluids are requested to flow in parallel and equally with a flat meniscus, the aforementioned inequality causes unequal mobility ratio between the two microfluids and may create air bubbles, which is troublesome. The two microfluids should have the equal mobility in the chamber to avoid the problems.

A paper published by Zhao et al. in the University of Illinois, entitled "Surface-Directed Liquid Flow Inside Microchannel," Science Vol. 291, pp. 1023-1027, February 2001, discloses a method of forming a flow channel by using a photolithography and controlling the flow of a single fluid by adjusting the hydrophilic property of the surface of the flow channel.

However, the conventional method may be able to control the flow channel that a single fluid flows, it cannot control multiple fluids equally flow into a chamber.

There is no research suggesting the concept that the flow of multiple fluids is controlled to be equal and parallel in a chamber by disposing hydrophilic surfaces and hydrophobic surfaces alternately in the flow channels.

SUMMARY OF THE INVENTION

It is, therefore, an object of the present invention to provide a microfluidic device that can equalize the flow of multiple microfluids in a chamber in parallel to thereby have an equal flow rate when the microfluids transferred through different flow channels join in the chamber having a changing cross-sectional area, and a microfluidic network formed by connecting such microfluidic devices.

It is another object of the present invention to provide a microfluidic network formed by connecting the microfluidic devices capable of equalizing the flow of multiple microfluids in a chamber in a tree structure.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a microfluidic device capable of equalizing flow of multiple microfluids in a chamber, which includes: a plurality of flow channels that are formed between an upper substrate and a lower substrate to transfer the microfluids and include inlets for injecting the microfluids in one side and fluid stopping surfaces for stopping the flow of the microfluids in the other side; a pressure controlling flow channel for removing a pressure difference between the microfluids injected into the flow channels, respectively, and connecting the inlets; a fluid converging part for converging the microfluids that are transferred passing through the fluid stopping surfaces, respectively; and a chamber composed of hydrophilic surfaces and hydrophobic surfaces disposed alternately in a direction that the microfluids flow so that the microfluids joining in the fluid converging part flow in parallel and equal, the hydrophilic surfaces and the hydrophobic surfaces having a predetermined width.

In accordance with another aspect of the present invention, there is provided a microfluidic network, which includes a plurality of the microfluidic devices capable of equalizing flow of multiple microfluids in a chamber that are connected in a tree structure.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter. When it is considered that detailed description on a related art may obscure the points of the present invention, the description will not be provided. Hereinafter, specific embodiments of the present invention will be described in detail with reference to the accompanying drawings.

Figure 1A:
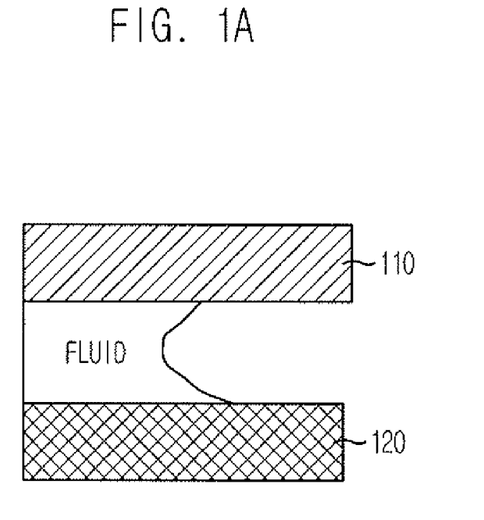
FIGS. 1A to 1C are cross-sectional views showing the meniscus of the flow of a microfluid according to the hydrophilic property of an upper substrate and a lower substrate.
Figure 1B:
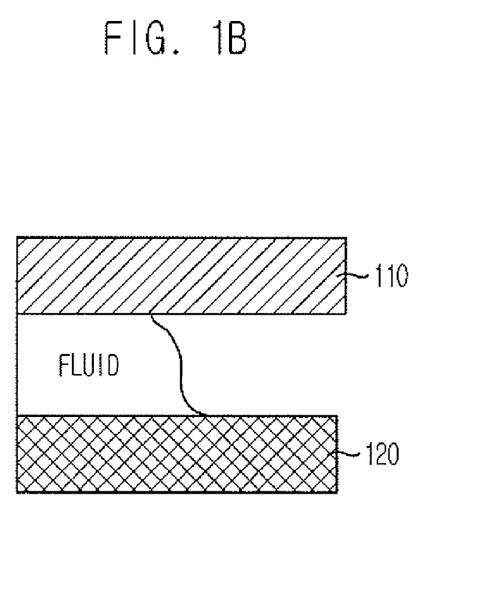
Figure 1C:
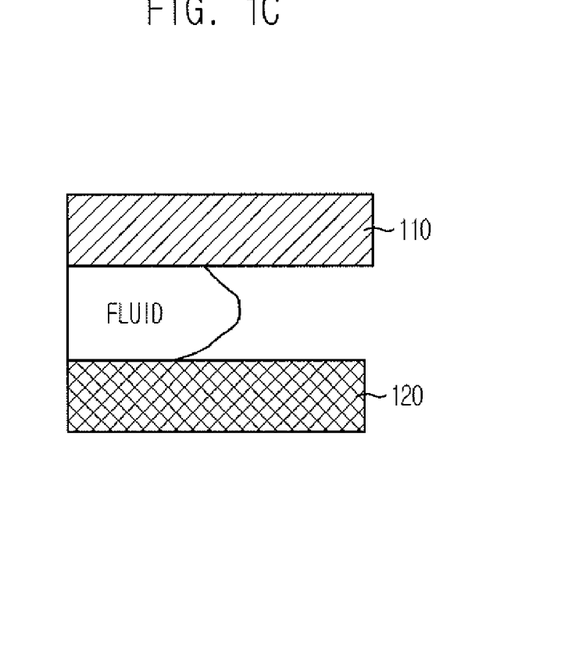

FIGS. 1A to 1C are cross-sectional views showing the meniscus of the flow of a microfluid according to the hydrophilic property of an upper substrate surface and a lower substrate surface. The drawings show a fluid flowing based on a capillary phenomenon.

FIG. 1A shows a line-end shape of a fluid, i.e., meniscus, when the upper substrate 110 and the lower substrate 120 are formed of a hydrophilic material in a microfluidic device that can equalize the flow of multiple fluids in parallel. FIG. 1B shows a line-end shape of the fluid when the upper substrate 110 is formed of a hydrophobic material and the lower substrate 120 is formed of a hydrophilic material in the microfluidic device. FIG. 1C shows a line-end shape of a fluid when the upper substrate 110 and the lower substrate 120 are formed of a hydrophobic material in the microfluidic device.

In case of FIG. 1A and when the inner surface of the flow channel has a stronger hydrophilic property than a hydrophobic property in FIG. 1B, the flow can flow even without any external pressure. However, in case of FIG. 1C and when the inner surface of the flow channel has a stronger hydrophobic property than a hydrophilic property in FIG. 1B, pressure should be applied to make the fluid flow.

In the embodiment of the present invention, the hydrophilic property of the surface of the flow channel is controlled to make the flow phenomena shown in FIGS. 1A and 1B appear alternately. This method can equalize the flow of multiple fluids in a chamber in parallel.

Figure 3:
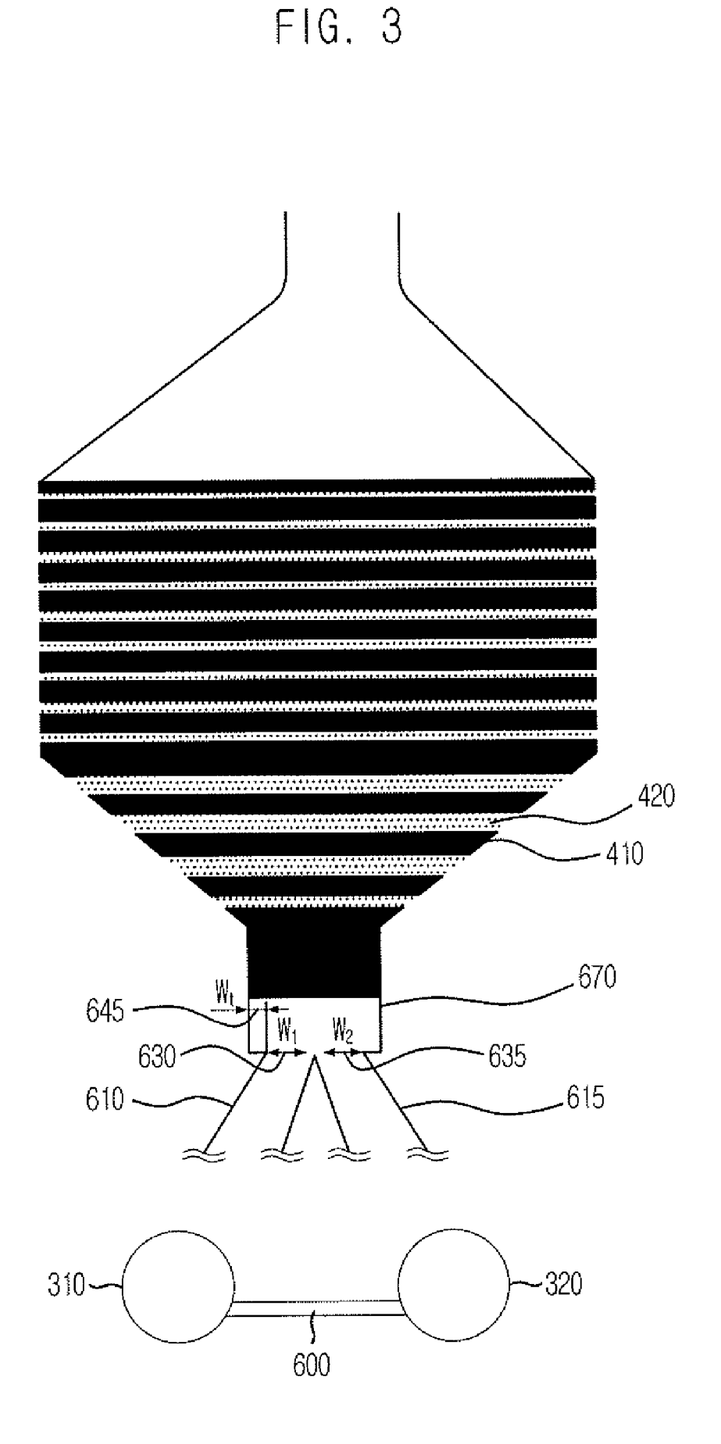
FIG. 3 is a plane view illustrating a microfluidic device capable of equalizing flow of two microfluids in a chamber according to an embodiment of the present invention.

Meanwhile, a first fluid inlet 310 and a second fluid inlet 320, which are shown in FIG. 3, may be optionally formed in the upper substrate 110 or the lower substrate 120.

Figure 2A:
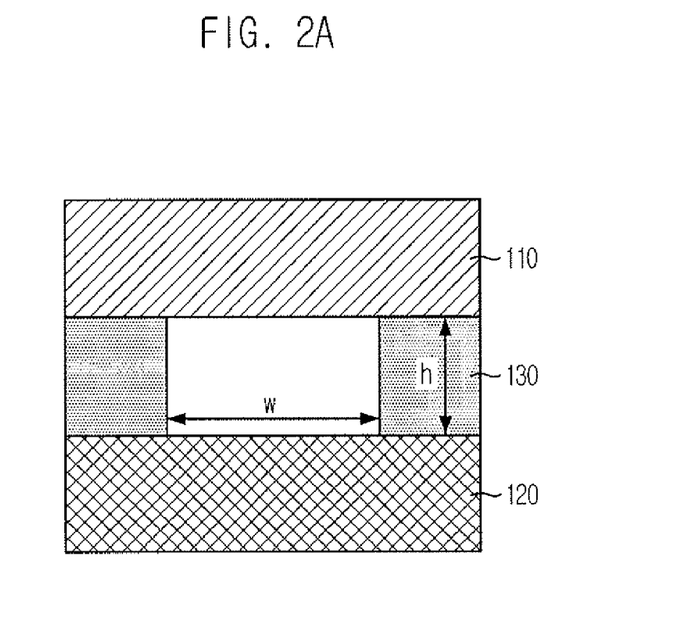
FIG. 2A is a cross-sectional view showing a microfluid flow channel that is formed of an upper substrate, a lower substrate and a middle substrate.
Figure 2B:
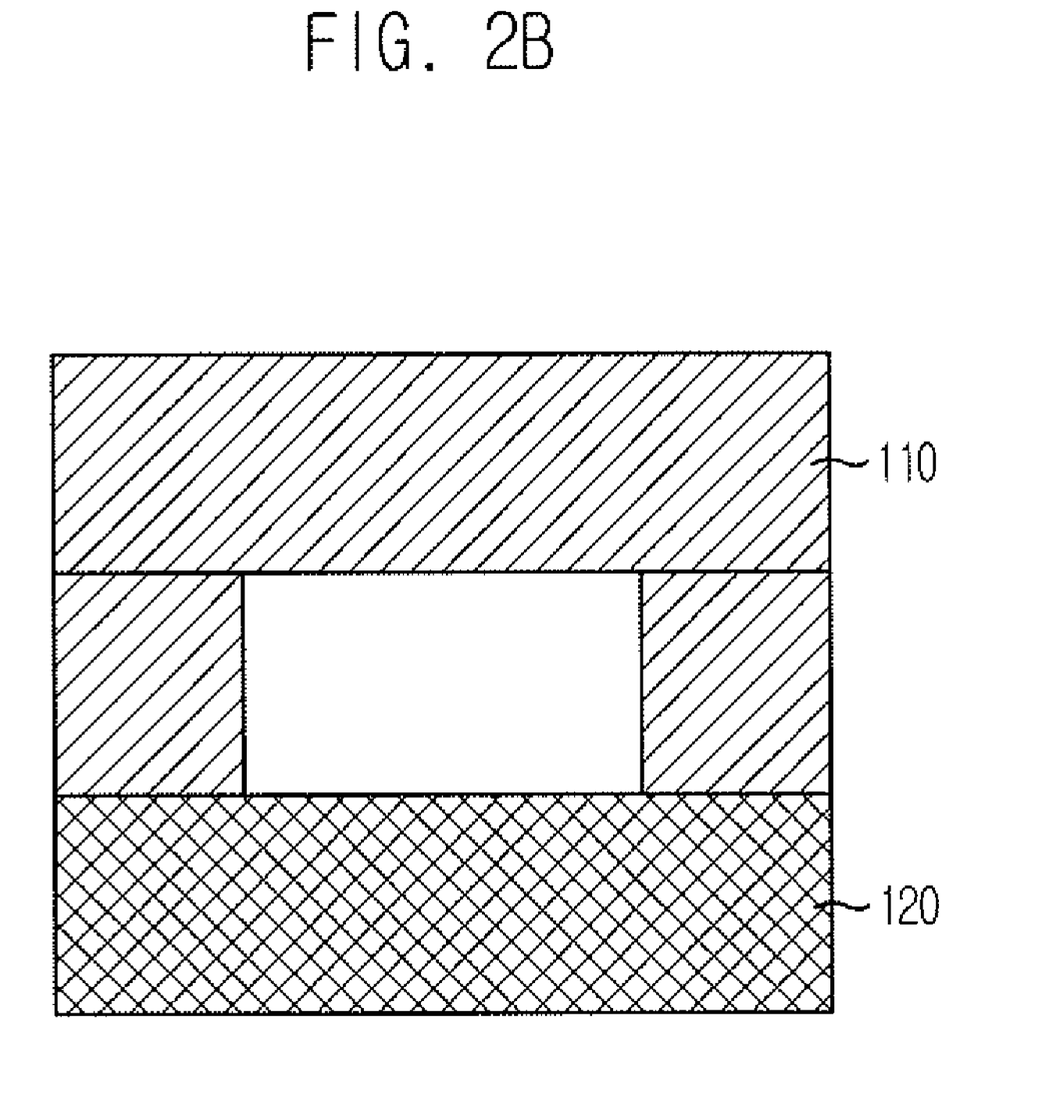
FIG. 2B is a cross-sectional view showing a microfluid flow channel that is formed of an upper substrate and a lower substrate.

FIGS. 2A and 2B show cross sections of a flow channel used in the embodiment of the present invention. FIG. 2A is a cross-sectional view showing a microfluid flow channel that is formed of an upper substrate 110, a lower substrate 120 and a middle substrate 130. FIG. 2B is a cross-sectional view showing a microfluid flow channel that is formed of the upper substrate 110 and the lower substrate 120.

The upper, lower and middle substrates may be formed of any materials, such as glass, plastics, and metal. However, they are usually formed of a transparent polymer or a photoresist onto which photolithography can be performed, such as SU-8. The transparent polymer may be one selected from the group consisting of polydimethylsiloxane (PDMS), polymethylmethacrylate (PMMA), polycarbonate (PC), cycloolefin copolymer (COC), polyamide (PA), polyethylene (PE), polypropylene (PP), polyphenylene ether (PPE), polystyrene (PS), polyoxymethylene (POM), polyetheretherketone (PEEK), polytetrafluoroethylene (PTFE), polyvinylchloride (PVC), polyvinylidene fluoride (PVDF), polybutyleneterephthalate (PBT), fluorinated ethylenepropylene (FEP), perfluoralkoxyalkane (PFA).

Also, the upper substrate 110 may be fabricated by using a metal or silicon structure as a master and performing hot embossing, injection molding, or casting. The metal or silicon structure may be fabricated by using a conventional machining method, such as laser ablation, rapid prototyping, and numerical control (NC) machining, or by using a semiconductor processing method, such as photolithography. The lamination of the substrates may be performed by using a generally used adhesive agent or a gluing agent, or by performing welding or an ultrasonic lamination method according to the material.

The upper and lower substrates 110 and 120 are composed of hydrophilic surfaces 410 and hydrophobic surfaces 420, which are shown in FIG. 3, to alternately control the extent of the hydrophilic property. Herein, the hydrophilic surfaces 410 and the hydrophobic surfaces 420 may be fabricated by depositing a hydrophilic material and a hydrophobic material, respectively, on the upper and lower substrates 110 and 120 by using a conventional shadow mask, or they may be fabricated by performing photolithography, which is a process used for manufacturing of semiconductors.

FIG. 3 is a plane view illustrating a microfluidic device capable of equalizing flow of two microfluids in a chamber according to an embodiment of the present invention.

The microfluidic device suggested in the embodiment of the present invention includes surfaces with alternating hydrophilic property so that multiple microfluids can flow in parallel in a chamber having a changing cross-sectional area in a manual fluid control system based on the capillary phenomenon. In short, the present invention takes advantage of fluid transferring based the capillary phenomenon. When the multiple fluids have the same surface tension and contact angle or different kinds of fluids join and enter a chamber having a changing cross-sectional area, the technology of the present invention equalize the flow of the fluids in parallel in the chamber with a flat meniscus.

To be specific, the microfluidic device suggested in the embodiment of the present invention utilizes the capillary pressure to transfer a fluid. The microfluidic device resolves the problem that multiple fluids unequally flow in a chamber having a changing cross-sectional area based on a capillary pressure barrier caused by a flow channel aspect ratio (width to height) in a fluid stopping surface and a flow mobility delay angle formed by the fluid stopping surface and a mobility delay step.

The microfluidic device suggested in the embodiment of the present invention includes a pressure controlling flow channel 600, first and second flow channels 610 and 615, a fluid converging part 670, a mobility delaying step 645, and a chamber. The chamber is formed of hydrophilic surfaces 410 and hydrophobic surfaces 420 disposed alternately.

Figure 5A:
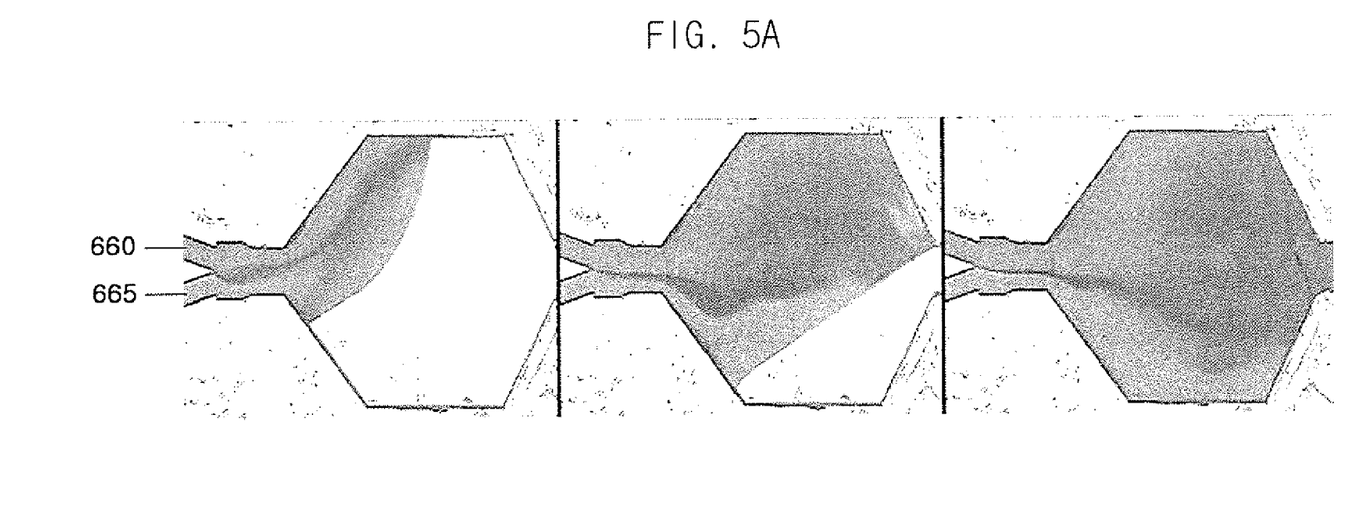
FIGS. 5A and 5B are pictures showing the flow of multiple microfluids in a typical microfluidic device.

The first and second flow channels 610 and 615 transfer a first fluid 660 and a second fluid 665, as shown in FIG. 5A. The first and second flow channels 610 and 615 are formed between the upper substrate 110 and the lower substrate 120.

The first and second flow channels 610 and 615 include first and second fluid inlets 310 and 320, respectively, in one side to injecting the first and second fluids 660 and 665, which is shown in FIG. 5A. They include first and second fluid stopping surfaces 630 and 635 to stop the flow of the first and second fluids 660 and 665 on the other side, respectively.

The pressure controlling flow channel 600 has the first and second fluid inlets 310 and 320 connected to each other to thereby resolve the problem of the pressure difference between the first and second fluids 660 and 665.

The fluid converging part 670 converges the first and second fluids 660 and 665 that have passed through the first and second fluid stopping surfaces 630 and 635 into one flow channel so that the fluid of one flow channel enters the chamber. The flow mobility delaying step 645 is formed in a continued line of the first and second fluid stopping surfaces 630 and 635 to thereby reduce the flowing rate of the fluid. Herein, the width of the first fluid stopping surface 630 is $w_1$, while the width of the second fluid stopping surface 635 is $w_2$. Herein, the reference numeral '645' denotes the length wt of the mobility delaying step.

In the flow channel, hydrophilic surfaces formed of a hydrophilic material and hydrophobic surfaces formed of a hydrophobic material are alternately disposed in a direction that the fluids converging in the fluid converging part 670 flow. The hydrophilic surfaces and the hydrophobic surfaces have a predetermined width, which may range from 1 μm to 400 μm. Also, any one between the surface of the upper substrate and the surface of the lower substrate may be formed of a hydrophilic material and the other substrate may be formed of hydrophilic surfaces and hydrophobic surfaces alternating each other in the chamber. Both upper substrate surface and lower substrate surface of the chamber may be formed of hydrophilic surfaces and hydrophobic surfaces alternately disposed.

Hence, the first and second fluids 660 and 665 joining in the fluid converging part 670 and entering the chamber with a changing cross-sectional area form parallel flow with a flat meniscus in the structure that the hydrophilic surfaces and the hydrophobic surfaces are disposed alternately.

Figure 4:
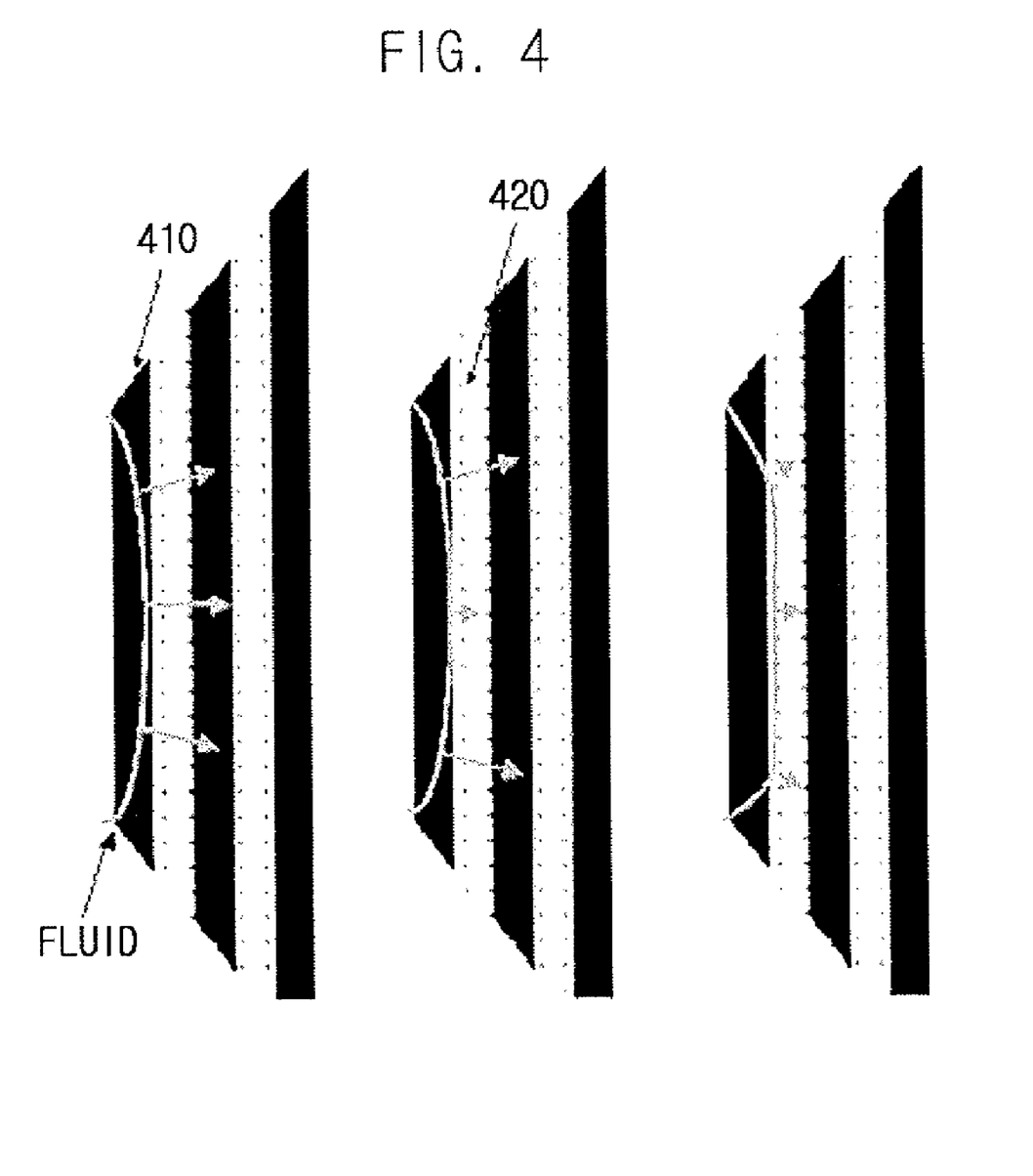
FIG. 4 is a view describing a principle of how a fluid meniscus proceeds in the microfluidic device capable of equalizing the flow of microfluids in a chamber according to an embodiment of the present invention.

FIG. 4 is a view describing a principle of how a fluid meniscus proceeds in the microfluidic device capable of equalizing the flow of a microfluid in a chamber according to an embodiment of the present invention.

First, a fluid that has passed through the hydrophilic surfaces 410 arrives in the hydrophobic surface 420 with the uniform velocity in the entire meniscus. Herein, the fore part of the convex surface reaches the hydrophobic surface 420, and the proceeding speed is reduced from the meniscus part that has arrived at the hydrophobic surface first. Since the rear end of the fluid remains in the hydrophilic surface 410 although the fore part of the fluid has reached in the hydrophobic surface 420, the fluid still maintains the fast flowing rate. The fast flowing rate becomes slow when the fluid arrives at the hydrophobic surface 420. This way, most of the meniscus arrives in the hydrophobic surface 420 to make the shape of the meniscus flat.

The alternation between the hydrophilic surfaces and the hydrophobic surfaces repeatedly forms flat meniscus to thereby maintain uniform fluid flow mobility in the chamber.

Figure 5B:
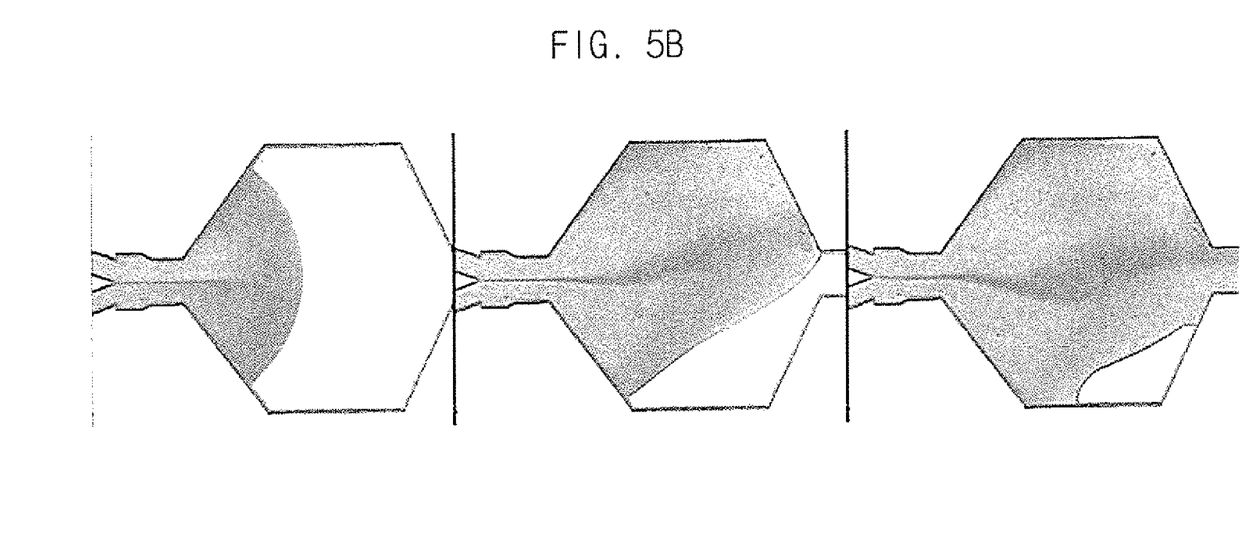

FIGS. 5A and 5B are pictures showing the flow of multiple microfluids in a typical microfluidic device. The pictures show the flow of the multiple microfluids in a microfluidic device that does not have a structure where hydrophilic surfaces and hydrophobic surfaces are disposed alternately.

Figure 5C:
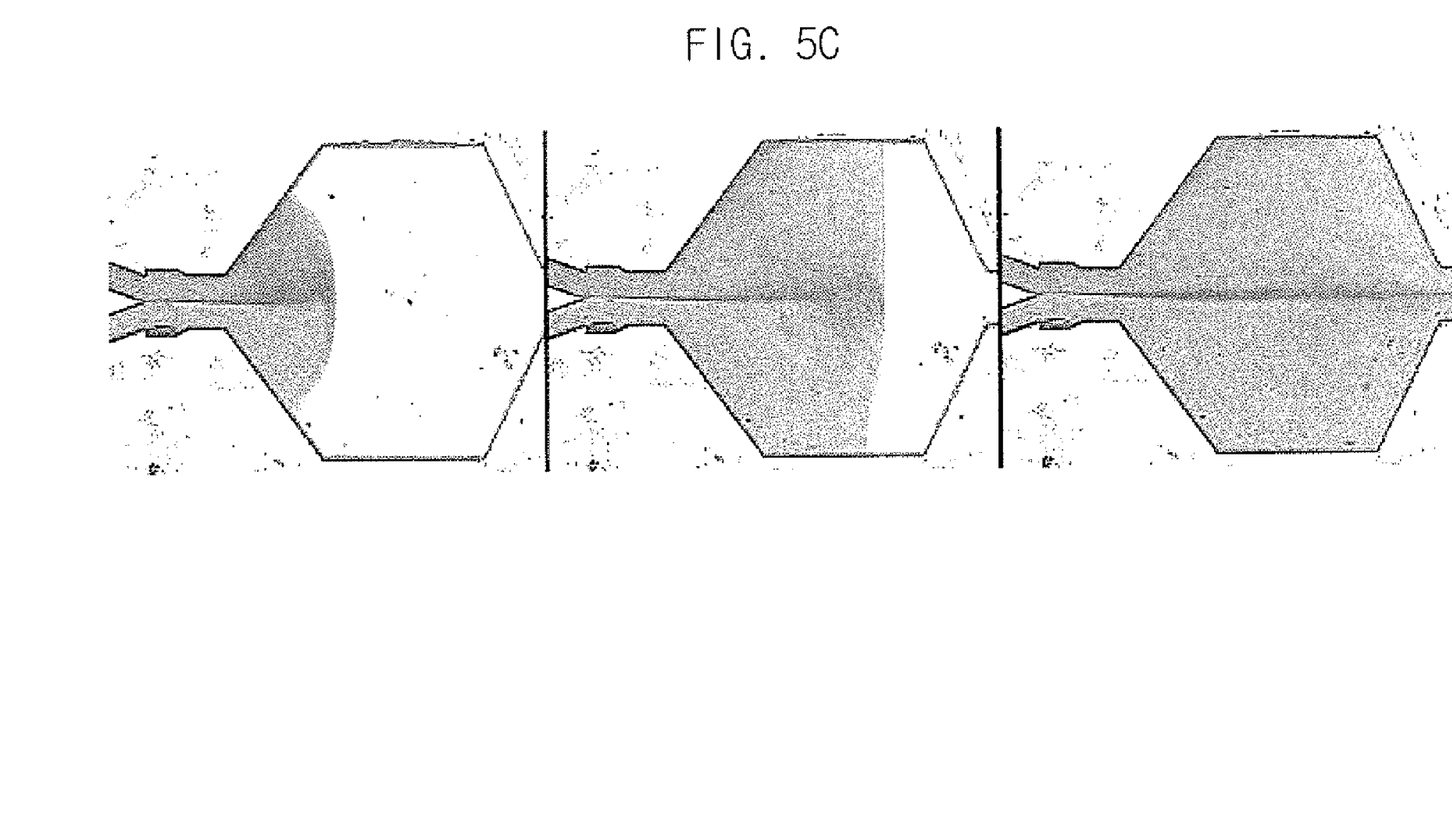
FIG. 5C presents pictures showing the flow of multiple microfluids in a microfluidic device having a structure that hydrophilic surfaces and hydrophobic surfaces are disposed alternately according to an embodiment of the present invention.

FIG. 5C presents pictures showing the flow of multiple microfluids in a microfluidic device having a structure that hydrophilic surfaces and hydrophobic surfaces are repeated alternately according to an embodiment of the present invention.

Referring to FIG. 5C, two fluids flowing through two flow channels converge and flow in equal and parallel in the chamber.

Hereinafter, basic operation of the microfluidic device that can equalize the flow of multiple fluids in the chamber will be described with reference to FIGS. 4 and 5C.

When there are two flow channels and the two flow channels converge in the flow channel converging part 670, the first flow channel 610 and the second flow channel 615 meet the first fluid stopping surface 630 and the second fluid stopping surface 635, respectively.

There is the flow mobility delaying step 645 formed adjacent to the first fluid stopping surface 630 and the second fluid stopping surface 635. The first fluid 660 and the second fluid 665 that have passed through the first flow channel 610 and the second flow channel 615 arrive at the first fluid stopping surface 630 and the second fluid stopping surface 635, join with each other and flow into the chamber.

In FIG. 5A, the microfluidic device does not have the pressure controlling flow channel 600. Thus, the first fluid 660 flows faster than the second fluid 665 and makes the flow mobility ratio in the chamber unequal or create air bubbles due to the different surface tension and contact angles of the first fluid 660 and the second fluid 665.

It can be seen from FIG. 5B that the flow of multiple fluids becomes unequal in a microfluidic device having a chamber with a changing cross-sectional area and the pressure controlling flow channel 600 but not having a structure that the hydrophilic surfaces and the hydrophobic surfaces are alternately disposed.

FIG. 5 shows a microfluidic device having the pressure controlling flow channel 600 and a chamber with a changing cross-sectional area and a structure that the hydrophilic surfaces 410 and the hydrophobic surfaces 420 are disposed alternately. The first fluid 660 joins with the second fluid 665, passes through the chamber with a changing cross-sectional area, and forms a flat meniscus through increase and decrease in the flow ratio in the chamber. The two fluids pass through the chamber while flowing in parallel to each other.

Figure 6A:
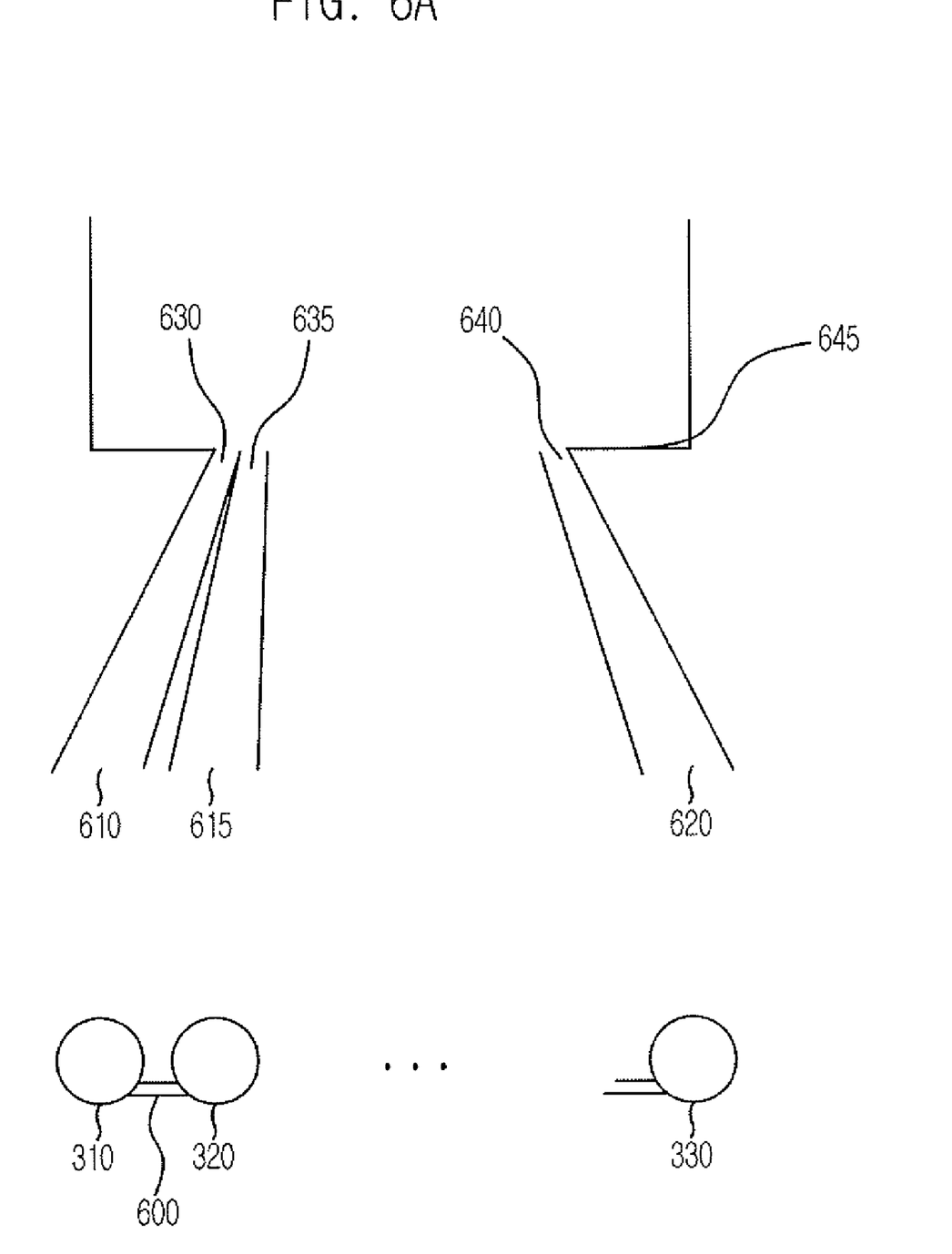
FIG. 6A is a plane view showing a microfluidic device capable of equalizing the flow of multiple microfluids in a chamber according to another embodiment of the present invention.

FIG. 6A is a plane view showing a microfluidic device capable of equalizing the flow of more than three microfluids in a chamber according to another embodiment of the present invention. The drawing shows that the chamber can be directly connected to one or more flow channels from a first flow channel 610 to an $n^{th}$ flow channel 620 by connecting the flow channels to the chamber.

Figure 6B:
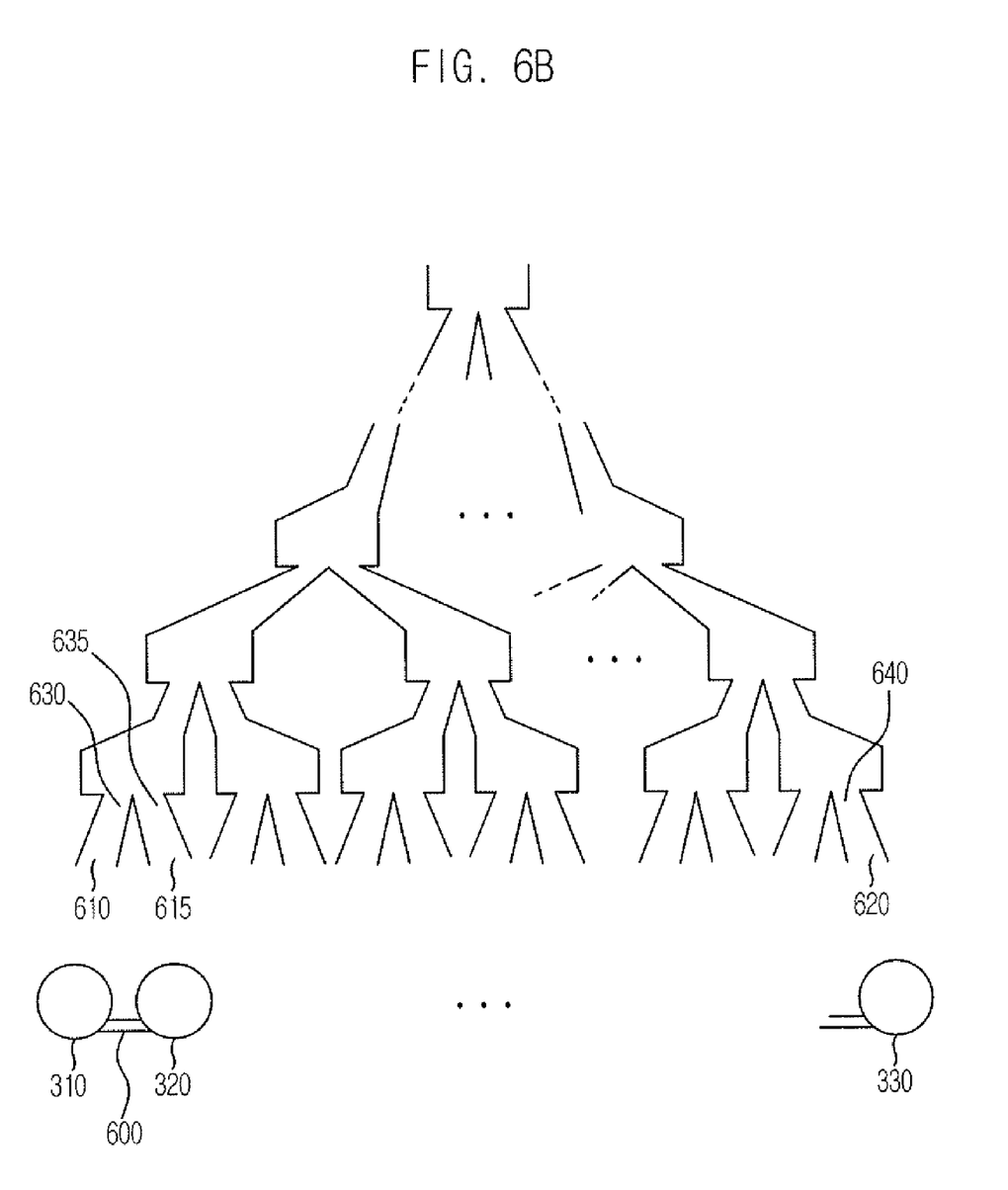
FIG. 6B is a plane view describing a microfluidic network formed by connecting a plurality of microfluidic devices of FIG. 3 according to yet another embodiment of the present invention.

FIG. 6B is a plane view describing a microfluidic network formed by connecting a plurality of the microfluidic devices of FIG. 3 serially and parallel in multiple steps, i.e., a tree structure. The number of the flow channels may be indirectly extended by taking a microfluidic device as a unit device and connecting the unit devices as many as desired.

The present invention can equalize the flow of multiple fluids in parallel at the meniscus when the fluids converge in a fluid converging part of a chamber and pass through the chamber in a microfluidic network.

The present application contains subject matter related to Korean Patent Application No. 2006-0094384, filed in the Korean Intellectual Property Office on Sep. 27, 2006, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A microfluidic device capable of equalizing flow of multiple microfluids in a chamber, comprising:
   a plurality of flow channels that are formed between an upper substrate and a lower substrate to transfer the microfluids and include inlets for injecting the microfluids in one side and fluid stopping surfaces for stopping the flow of the microfluids in the other side;
   a pressure controlling flow channel for removing a pressure difference between the microfluids injected into the flow channels, respectively, and connecting the inlets;
   a fluid converging part for converging the microfluids that are transferred passing through the fluid stopping surfaces, respectively; and
   a chamber composed of hydrophilic surfaces and hydrophobic surfaces disposed alternately in a direction that the microfluids flow so that the microfluids joining in the fluid converging part flow in parallel and equal, the hydrophilic surfaces and the hydrophobic surfaces having a predetermined width.

2. The microfluidic device as recited in claim 1, wherein the flow channels further include a middle substrate disposed between the upper substrate and the lower substrate.

3. The microfluidic device as recited in claim 1, further comprising:
   a flow mobility delaying step which is formed in an extended line of the fluid stopping surfaces and reduces the flowing rate of the microfluids.

4. The microfluidic device as recited in claim 1, wherein the cross-sectional area of the chamber is changed.

5. The microfluidic device as recited in claim 4, wherein any one surface of the chamber between the upper substrate and the lower substrate is formed of hydrophilic substrates and hydrophobic substrates disposed alternately.

6. The microfluidic device as recited in claim 5, wherein the surface of the chamber is formed of hydrophilic substrates and hydrophobic substrates disposed alternately and the hydrophilic and hydrophobic substrates have a width ranging from 1 μm to 400 μm.

7. A microfluidic network, comprising:
   a plurality of microfluidic devices capable of equalizing flow of multiple microfluids in a chamber that are connected in a tree structure,
   wherein each microfluidic device includes:
   a plurality of flow channels that are formed between an upper substrate and a lower substrate to transfer the microfluids and include inlets for injecting the microfluids in one side and fluid stopping surfaces for stopping the flow of the microfluids in the other side;
   a pressure controlling flow channel for removing a pressure difference between the microfluids injected into the flow channels, respectively, and connecting the inlets;
   a fluid converging part for converging the microfluids that are transferred passing through the fluid stopping surfaces, respectively; and
   a chamber composed of hydrophilic surfaces and hydrophobic surfaces disposed alternately in a direction that the microfluids flow so that the microfluids joining in the fluid converging part flow in parallel and equal, the hydrophilic surfaces and the hydrophobic surfaces having a predetermined width.

8. The microfluidic network as recited in claim 7, wherein the flow channels further include a middle substrate disposed between the upper substrate and the lower substrate.

9. The microfluidic network as recited in claim 7, further comprising:
   a flow mobility delaying step which is formed in an extended line of the fluid stopping surfaces and reduces the flowing rate of the microfluids.

10. The microfluidic network as recited in claim 7, wherein the cross-sectional area of the chamber is changed.

11. The microfluidic network as recited in claim 10, wherein any one surface of the chamber between the upper substrate and the lower substrate is formed of hydrophilic substrates and hydrophobic substrates disposed alternately.

12. The microfluidic network as recited in claim 11, wherein the surface of the chamber is formed of hydrophilic substrates and hydrophobic substrates disposed alternately and the hydrophilic and hydrophobic substrates have a width ranging from 1 μm to 400 μm.

* * * * *